(12) United States Patent
Bruce et al.

(10) Patent No.: US 9,047,585 B2
(45) Date of Patent: Jun. 2, 2015

(54) METHOD AND SYSTEM FOR INFORMED DECISION MAKING TO LOCATE A WORKFORCE

(76) Inventors: Michael Bruce, New York, NY (US); Curtis Lynch, Stonington, CT (US)

(*) Notice: Subject to any disclaimer, the term of this patent is extended or adjusted under 35 U.S.C. 154(b) by 0 days.

(21) Appl. No.: 13/068,522

(22) Filed: May 13, 2011

(65) Prior Publication Data

US 2011/0276355 A1    Nov. 10, 2011

Related U.S. Application Data

(63) Continuation of application No. 12/290,722, filed on Nov. 3, 2008, now abandoned.

(60) Provisional application No. 61/001,826, filed on Nov. 5, 2007.

(51) Int. Cl.
| | | |
|---|---|---|
| G06F 7/00 | (2006.01) | |
| G06F 17/30 | (2006.01) | |
| G06Q 10/10 | (2012.01) | |
| G06Q 10/06 | (2012.01) | |

(52) U.S. Cl.
CPC .............. *G06Q 10/10* (2013.01); *G06Q 10/063* (2013.01); *G06Q 10/0631* (2013.01); *G06Q 10/105* (2013.01)

(58) Field of Classification Search
None
See application file for complete search history.

(56) References Cited

U.S. PATENT DOCUMENTS

| | | | |
|---|---|---|---|
| 5,913,214 A | 6/1999 | Madnick | |
| 7,035,855 B1 | 4/2006 | Kigler | |
| 7,065,522 B2 | 6/2006 | Taylor | |
| 7,133,864 B2 | 11/2006 | Roth | |
| 7,287,016 B2 | 10/2007 | Johnson | |
| 7,480,659 B2* | 1/2009 | Chmura et al. | 1/1 |
| 2002/0046210 A1* | 4/2002 | Thomsen | 707/100 |
| 2002/0198765 A1* | 12/2002 | Magrino et al. | 705/11 |
| 2007/0016553 A1* | 1/2007 | Dumais et al. | 707/2 |
| 2009/0299993 A1* | 12/2009 | Novack | 707/5 |
| 2010/0153289 A1* | 6/2010 | Schneiderman et al. | 705/320 |
| 2011/0276534 A1* | 11/2011 | Ubalde et al. | 707/600 |

* cited by examiner

*Primary Examiner* — Rehana Perveen
*Assistant Examiner* — Raheem Hoffler
(74) *Attorney, Agent, or Firm* — Benjamin Davis

(57) ABSTRACT

The present invention concerns a computer-implemented method and system that aides in reducing the amount of regret experienced when deciding between and amongst geographic areas having a suitable workforce. More specifically, the present invention includes a user selecting critical factors relating to worker demographics that define geographic areas. Data is returned to the user's computer as a virtual table and is a mixture of critical or informational factors qualifying all areas returning data. Each area is ranked according to the value of lowest returned index number, which gives the user a quick assessment of problematic critical factors for each area. Area utilities are created and give the user the ability to simultaneously compare all remaining areas to one another so that they may select at least one area amongst many with the smallest chance for a bad surprise. This reduces the regret of a user having to select one area over another having a suitable workforce for their business needs.

8 Claims, 8 Drawing Sheets

| STEP ONE: Select Occupation | STEP TWO: Select Industry (optional) | STEP THREE: Select Factors | STEP FOUR: View Results |

Occupation: SOC 29 Healthcare Practitioner and Technical :: SOC 29-1111 Registered nurses :: Falls under EEO-1 #2 Professionals Search for an Industry: [        ] [Search]   Click on reset if you want to change your search. [Reset]   [Continue]

OR

Select an Industry Category
From the list below: ----> and (optional) ---->    Select an Industry Subcategory from the list below:

Sort by Title :: Sort by SOC    Sort by Title :: Sort by SOC :: Select All

| SOC 17 Architecture and Engineering | SOC 29-2033 Nuclear medicine technologists |
| SOC 27 Arts, Design, Entertainment, Sports, and Media | SOC 29-1064 Obstetricians and gynecologists |
| SOC 37 Building and Grounds Cleaning and Maintenance | SOC 29-9011 Occupational health and safety specialists |
| SOC 13 Business and Financial Operations | SOC 29-9012 Occupational health and safety technicians |
| SOC 21 Community and Social Services | SOC 29-1122 Occupational therapists |
| SOC 15 Computer and Mathematical | SOC 29-2081 Opticians, dispensing |
| SOC 47 Construction and Extraction | SOC 29-1041 Optometrists |
| SOC 25 Education, Training and Library | SOC 29-1022 Oral and maxillofacial surgeons |
| SOC 45 Farming, Fishing, and Forestry | SOC 29-1023 Orthodontists |
| SOC 35 Food Preparation and Serving Related | SOC 29-2091 Orthotists and prosthetists |
| SOC 29 Healthcare Practitioner and Technical | SOC 29-1065 Pediatricians, general |
| SOC 31 Healthcare Support | SOC 29-1051 Pharmacists |
| SOC 49 Installation, Maintenance, and Repair | SOC 29-2052 Pharmacy technicians |
| SOC 23 Legal | SOC 29-1123 Physical therapists |
| SOC 19 Life, Physical, and Social Science | SOC 29-1071 Physician assistants |
| SOC 11 Management | SOC 29-1069 Physicians and surgeons, all other remaining occupations not listed |
| SOC 43 Office and Administrative Support | SOC 29-1081 Podiatrists |
| SOC 39 Personal Care and Service | SOC 29-2053 Psychiatric technicians |
| SOC 51 Production | SOC 29-1066 Psychiatrists |
| SOC 33 Protective Service | SOC 29-1124 Radiation therapists |
| SOC 41 Sales and Related | SOC 29-2034 Radiologic technologists and technicians |
| SOC 53 Transportation and Material Moving | SOC 29-1125 Recreational therapists |
|  | SOC 29-1111 Registered nurses |
|  | SOC 29-1126 Respiratory therapists |
|  | SOC 29-2054 Respiratory therapy technicians |
|  | SOC 29-1127 Speech-language pathologists |
|  | SOC 29-1067 Surgeons |

Fig. 3

| STEP ONE: Select Occupation | STEP TWO: Select Industry (optional) | STEP THREE: Select Factors | STEP FOUR: View Results |

Occupation: SOC 29 Healthcare Practitioner and Technical :: SOC 29-1111 Registered nurses :: Falls under EEO-1 #2 Professionals Industry: NAICS 62 Healthcare and Social Assistance :: NAICS 622 Hospitals Only the industries which employ "SOC 29-1111 Registered nurses" are listed below. To see more industry choices, please select a broader occupation and/or industry.

Search for an industry: [        ]  Search      Click on reset if you want to change your search. [Reset]

OR

Select an Industry Category
From the list below: ——> and (optional) ——>
Sort by Title :: Sort by NAICS Select an Industry Subcategory
from the list below:
Sort by Title :: Sort by NAICS :: Select All Sub-categories: Broader :: Less Broad :: Narrower :: Very narrow NAICS 56 Administrative & Support, Waste Management and Remediation Services
NAICS 71 Arts, Entertainment, and Recreation
NAICS 61 Educational Services
NAICS 52 Finance and Insurance
    Government
NAICS 62 Healthcare and Social Assistance
NAICS 55 Management of Companies and Enterprises
NAICS 81 Other Services (except Public Administration)
NAICS 54 Professional, Scientific, and Technical Services
NAICS 53 Real Estate and Rental and Leasing
NAICS 44-45 Retail Trade
NAICS 48-49 Transportation, Warehousing, Postal Service, Couriers
NAICS 42 Wholesale Trade NAICS 621 Ambulatory healthcare Services
NAICS 622 Hospitals
NAICS 623 Nursing and Residential Care Facilities
NAICS 624 Social Assistance

METHOD AND SYSTEM FOR INFORMED
DECISION MAKING TO LOCATE A
WORKFORCE

CROSS REFERENCE TO RELATED
APPLICATIONS

This patent application is a continuation of patent application Ser. No. 12/290,722 filed Nov. 3, 2008, which is hereby abandoned. However, patent application Ser. No. 12/290,722 claims priority to provisional patent application No. 61/001,826 filed on Nov. 5, 2007.

FIELD OF THE INVENTION

The present invention generally relates to a computer-implemented method and system for informed decision making when a user decides between and amongst areas having a suitable workforce. More specifically, the present invention applies user selections that send computer automated SQL statements to at least one database over a Network. The SQL statements extract and index disparate data on workforce demographics for a range of geographic areas.

Non-limiting examples of user selections may include occupation or industry options and worker demographics representing various industry and occupation categories. Some worker demographics will be critical factors to the user's decision, and some may be purely informational. The user decides which factors will be critical or informational. Disparate data may include statistical data essential to quantifying worker demographics over a range of geographic areas. Disparate data may be mined from government or commercial databases and maintained on a private database.

Once user selections are applied to the present invention, data is returned to the user's computer as a virtual table. The matrix is a mixture of user selected critical or informational factors and represents all geographic areas returning data. Matrix columns describe various worker demographics. Matrix rows contain raw or index values quantifying worker demographics for each area.

All areas returning data are ranked according to the value of an area's lowest returned index number. Data is displayed to the user such that each critical factor having the lowest index value and its corresponding low value are extracted into additional columns and used as ranking factors for all area's returning data. The user screens all or some of the areas by setting a numerical range for critical or informational factors. Finally, the user creates a utility by weighting the ranked critical factors on a scale important to user needs when selecting a workforce.

The ability to compare an area's utility on an "apples to apples" basis against all areas returning data in the matrix enhances the user's decision on where to find a suitable workforce for its needs. This allows the user to select an area with the smallest chance for a bad surprise, which reduces the amount of regret associated in making that decision and giving confidence that their selection of an area will give the best return on worker demographics.

BACKGROUND OF THE INVENTION

Business owners examine many variables when assessing the advantages and disadvantages associated with finding qualified people to fill its workforce. Whether a business is relocating, building in a new area, expanding, or diversifying its workforce, poor analysis of industry and occupational variables frustrates a business's ability to make informed decisions. The cost and risk of making the wrong decision as to which geographic areas to explore, relative to workforce decisions, are significant. When multiple target areas are selected for investment or further research, thousands, even hundreds of thousands of dollars, and weeks, even months or years, are at risk if even one critical variable does not meet its threshold value.

The industry and occupational variables may include without limitation: the size of a metropolitan area, the number and types of minorities within an occupation, occupation employment, occupation unemployment, occupation wage, standard of living, industry unemployment, industry employment, total employment for an area, total unemployment for an area, job creation, new hires in occupations and industry, separations, turnover rate, average wages, cost of living, average wage inverse, unemployment, unemployment average, industry workforce, percentage of minorities, gender make up of an area, and the like. All variables are analyzed with respect to a user's prioritized needs and interest in having a business in a certain geographic area.

Various agencies collect data helpful to locating workers, non-limiting examples being the U.S. Census Bureau, the U.S. Bureau of Labor and Statistics, Bureau of Economic Analysis, America's Labor Market Information System, Council for Community and Economic Research, other private agencies, and the like. However, their databases are decentralized and somewhat chaotic. Each agency's system is designed for a different purpose, and, as a result, they often measure the same variable differently. Therefore, they arrive at results that may confuse non-economists. For example, the U.S. Census Bureau contains statistical data as related to industry while the Bureau of Labor and Statistics contains statistical data relating to occupations within industries.

Analyzers study and develop findings and conclusions for each database individually, but it is difficult to compare the data from each database on an "apples to apples" basis. None of these methods use a normalization variable or truly integrate the data from the databases into a coherent relationship to quickly analyze an employer's needs when filing its workforce.

Other methods include an in-depth and costly study of variables within a selected set of Metropolitan Statistical Areas, or MSAs. The drawbacks to these methods include selecting a bad area to either relocate or start your business, where the area is unattractive because of basic demographic, geographic, or economic variables that were difficult to identify prior to doing a more in depth study. It is important for businesses to eliminate all of the bad choices before paying a quarter million dollars to do a feasibility study on entering a specific geographic region to do business.

Therefore, there is a need for a computer-implemented method and system that allows a user to access and analyze worker demographics which are critical to making workforce decisions between and amongst geographic areas. The present invention allows the user to select critical factors relating to worker demographics, extract and rank all area's returning data based on an area's lowest index number, screening areas with unacceptable low values, and weighting the ranked critical factors for each area based on the user's needs, which measures the utility of each area. The user's informed decision is based on the present invention's ability to screen those areas with unacceptable low values and have the most potential for a high return on workforce needs.

SUMMARY OF THE INVENTION

Embodiments of the present invention address these problems via a computer-implemented method that locates a workforce across many geographic areas and allows a user to assess the amount of harm each area presents to their business needs through a user search that identifies and returns into a matrix geographic areas and their raw values relating to occupation variables, industry variables, or workforce variables. The user assesses the values for each returned area to subjectively remove unacceptable areas that are overly harmful to the their business needs, and applies a Min-Max Regret to select at least one remaining area having the least harmful values to their business needs. The Min-Max Regret includes the ability to simultaneously compare all remaining areas with total utility numbers, subjectively weighted variables, and values from each area. A total utility number for an area is created by indexing values returned for any variable for an area against their respective national average. The user then subjectively weights the importance of each variable and their index value by a percentage or five point scale. Each weighted index value for an area is summed into one total utility number. Each total utility number qualitatively allows the user to simultaneously assess and compare all area's workforce size, occupation variables, industry variables, and workforce variables to select the least harmful area with the desired workforce, thereby completing the Min-Max Regret.

It is an aspect of the present invention, wherein the raw values are numbers that qualify or quantify variables relating to occupation data, industry data, or workforce demographics.

It is an aspect of the present invention, wherein geographic areas, or areas, are regions characterized by Metropolitan Statistical Areas as defined by the Office of Management and Budget (OMB) and other United States federal government agencies for statistical purposes.

It is an aspect of the present invention, wherein the user includes a business, the media, or any other person or organization that needs to find a workforce among various Metropolitan Statistical Areas.

It is an aspect of the present invention, wherein all areas and their relevant values are generated, or displayed, or stored on permanent or temporary computer files on the user's computer or generated and accessed from a DBMS over a Network.

It is an aspect of the present invention, wherein occupation data, industry data, or workforce demographics are categories that are defined by variables that include the number and types of minorities within an occupation, occupation employment within a Metropolitan Statistical Area, occupation unemployment within a Metropolitan Statistical Area, occupation wage within a Metropolitan Statistical Area, standard of living within a Metropolitan Statistical Area, industry unemployment within a Metropolitan Statistical Area, industry employment within a Metropolitan Statistical Area, total occupation employment within a Metropolitan Statistical Area, total occupation unemployment within a Metropolitan Statistical Area, total industry employment within a Metropolitan Statistical Area, total industry unemployment within a Metropolitan Statistical Area, job creation within a Metropolitan Statistical Area, new hires within a Metropolitan Statistical Area, separations within a Metropolitan Statistical Area, turnover rate within a Metropolitan Statistical Area, average wages within a Metropolitan Statistical Area, cost of living within a Metropolitan Statistical Area, average wage inverse within a Metropolitan Statistical Area, industry unemployment within a Metropolitan Statistical Area, unemployment average within a Metropolitan Statistical Area, industry workforce within a Metropolitan Statistical Area, percentage of minorities within a Metropolitan Statistical Area, gender make up within a Metropolitan Statistical Area, the percent of industry employment in the given occupation, the percent of establishments reporting the given occupation in the given industry, the mean hourly industry or occupation wage, the mean annual industry and/or occupation wage, the percent relative standard error for the mean wage, employment percent relative error, or any combinations thereof.

It is an aspect of the present invention, wherein the database is private and housed on a computer server and accepts query languages comprising MS SQL/ASP.NET, MS Access/Visual Basic, MySQL/Coldfusion (CFML), HSQL/JSP (J2EE), PostgreSQL/Perl, MS SQL/Foxpro, Oracle/ASP.NET, or any combinations thereof.

Yet another aspect of the current invention includes a system to facilitate and support locating of a workforce across many geographic areas and allows a user to assess the amount harm each area presents to their business needs that includes a networked computer connected to a DBMS capable of using variables relating to occupation data, industry data, or workforce demographics to simultaneously filter and rank many Metropolitan Statistical Areas by; a user search that identifies and returns into a matrix geographic areas and their raw values relating to occupation variables, industry variables, or workforce variables; the user assessing the returned values for each geographic area to subjectively remove unacceptable areas that are overly harmful to the their business needs; the user employing a Min-Max Regret to select at least one remaining area having the least harmful variables to their business needs; wherein, a Min-Max Regret includes the ability to simultaneously compare all remaining areas with total utility numbers and subjectively weighted variables and values from each area, wherein a total utility number for an area is created by indexing raw values returned for any variable for an area against their respective national average, the user subjectively weighting the importance of each variable and their index value by a percentage or five point scale, summing all weighted indexed values for an area into one total utility number, ranking the remaining areas by their total utility numbers; and wherein, each total utility number qualitatively allows the user to simultaneously assess and compare all area's workforce size, occupation variables, industry variables, and worker variables to select the least harmful area with the desired workforce, thereby completing the Min-Max Regret.

It is an aspect of the present invention, wherein user selections are accessed over a Network at a computer server by web based applications, wherein user selections indicate at least one cell within at least one column and/or row of at least one database table having statistical data relating to industries and occupations within the database.

It is an aspect of the present invention, wherein user selections are accessed from a permanent or temporary computer file located on the user's computer, wherein user selections indicate at least one cell within at least one column and/or row of at least one database table having statistical data relating to industries and occupations within the database.

BRIEF DESCRIPTION OF THE DRAWINGS

The following figures are non-limiting examples and are not intended to limit the scope of the present invention.

FIG. 3 depicts a web menu where the user is prompted to select from a list of major occupational categories or subcategories as defined by a government agency.

FIG. 4 depicts a web menu where the user optionally selects from major industry categories or subcategories as defined by a government agency.

FIG. 5 depicts a web menu where the user selects from critical factors associated with statistical data defining worker demographics for occupation and industry categories.

DETAILED DESCRIPTION OF THE INVENTION

Definitions

Figure 1:
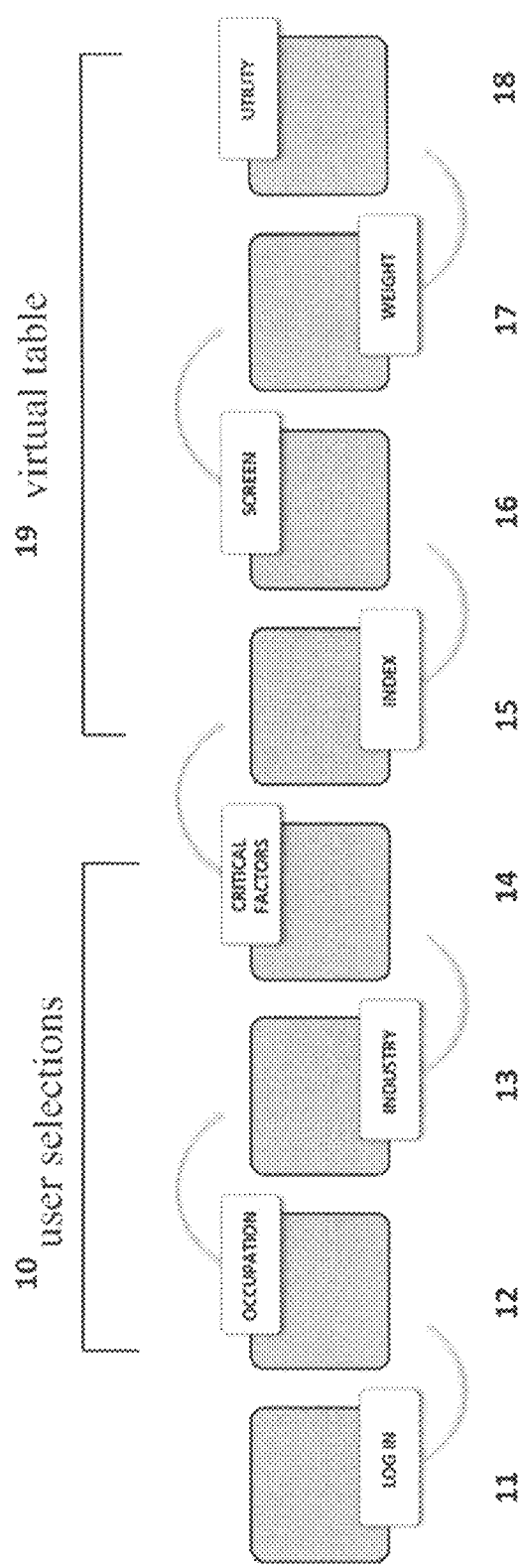
FIG. 1 depicts a general flow chart for the present invention, where the user logs in, creates a user selection by selecting occupation or industry categories, selects critical factors, and data is returned as a virtual table having index values for all critical factors for areas returning data. The user subjectively screens unacceptable areas and weights critical factors for the remaining areas. The weights on critical factors are used to create a utility value that the user compares against all areas in the virtual table.

To detail the present invention, the following non-limiting terms are used:

The term "table" generally refers to an arrangement of statistical data, words, numbers, or combinations of them, as in parallel columns and/or rows, to establish a set of relations in a definite, compact, and comprehensive form, wherein the data relates to statistical data on industries and occupations as complied by the U.S. Census Bureau, the Bureau of Labor and Statistics, the Bureau of Economic Analysis, America's Labor Market Information System, the Council for Community and Economic Research, other commercial databases, and the like.

The term "virtual table" generally refers to a web screen having a matrix containing all areas returning data based on user selections. The virtual table shows data for each critical factor extracted from the private database as identified by the user selections. Changing the data in the database alters the data shown in the virtual table. The virtual table presents the user with either indexed or raw data, or both, reflecting statistical data on occupation or industry demographics.

The term "Metropolitan Statistical Area" or "MSA" generally refers to one or more adjacent counties or county equivalents that have at least one urban cluster of at least 50,000 people plus adjacent territories having a high degree of social and economic integration. The U.S. Office of Management and Budget generates the MSA codes and designations.

The term "NAICS" generally refers to the North American Industry Classification System. Federal statistical agencies developed the NAICS to classify business establishments through the collection, analysis, and publication of statistical data related to business economy. The NAICS numbering system is a six-digit code as used by the United States of America, Canada, and Mexico. The first five digits are generally (although not always strictly) the same in all three countries. The last digit designates national industries. The first two digits designate the largest business sector, the third digit designates the sub-sector, the fourth digit designates the industry group, and the fifth digit designates particular industries.

Example business sectors may include without limitation: Forestry, Fishing, Hunting, and Agriculture Support, Mining, Utilities, Construction, Manufacturing, Wholesale Trade, Retail Trade, Transportation and Warehousing, Information, Finance and Insurance, Real Estate and Rental and Leasing, Professional, Scientific, and Technical Services, Management of Companies and Enterprises, Administrative and Support and Waste Management and Remediation Services, Educational Services, Health Care and Social Assistance, Arts, Entertainment, and Recreation, Accommodation and Food Services, Other Services (except Public Administration), and Unclassified.

The term "SOC" generally refers to Standard Occupational Classification. The SOC system is used by federal statistical agencies to classify workers into occupational categories for the purpose of collecting, calculating, or disseminating data. All workers are classified into one of over 820 occupations according to their occupational definition. To facilitate classification, occupations are combined to form 23 major groups, 96 minor groups, and 449 broad occupations. Each broad occupation includes detailed occupation(s) requiring similar job duties, skills, education, or experience.

The term "Menu," "Web Menu," "Graphical Screen," or "Screen" generally refers to a list of commands presented to a user by a computer or communications system. With a Menu, the user does not have to have a detailed knowledge or recall of syntax but is presented with graphical shortcuts and frequently-used commands to navigate a web page. A computer using a graphical user interface presents Menus with a combination of text and symbols to represent choices. By clicking on one of the symbols, the user selects instructions representing symbols.

The term "Disparate Data" or "Data" generally refers to statistical data relating to industry or occupational variables collected by various government and private agencies covering all MSAs. The Disparate Data is located in tables housed on databases, where the database is maintained over a Network.

The term "Database" generally refers to a private database accessible over a Network. The private database is relational and stores a collection of data on individual tables having at least one common relation. The database is operated and controlled by a private firm. A database administrator may maintain the database. Their duties are to implement and maintain the database system, establish policies and procedures pertaining to management, security, maintenance, and use of the database management system.

The term "Network" generally refers to an electronically connected group of computers including, but not limited to, the following: the World Wide Web/Internet, Intranet, Local Area Networks (LAN), Wide Area Networks (WAN), or Wireless Wide Area Networks (WWAN).

The term "Module" generally refers to sub-routines, procedures, definitional statements and macros. Each Module may be separately compiled and linked into a single executable program. The Module processes may be arbitrarily redistributed to one of the other modules, combined together in a single module, or made available in, for example, a shareable dynamic link library.

The term "worker demographic" generally refers to the characteristics of a population based on occupation or industry categories, where non-limiting examples include gender, race, age, income, disabilities, mobility, employment status, and location of a person's occupation or industry by geographic area.

The term "min-max-regret or min-max" generally refers to an algorithm that aids in making informed decisions where the consequences of that decision depend on an unknown critical factor. More specifically, the min-max-regret algorithm is a powerful analytical tool that quickly returns geographical areas having a range of negative critical factors. When compared against all geographical areas returning "deal breaking" critical factors, the user selects the area returning the least negative critical factor and avoids costly mistakes when selecting that area from the returned data set.

The term "critical factor" generally refers to a range of worker demographics that may or may not be problematic factors for a user when making an informed decision between and amongst geographic areas having a suitable workforce.

The term "index" generally refers to a number (as a ratio) derived from a series of observations and used as an indicator or measure. a number used to indicate change in magnitude (as of cost or price) as compared with the magnitude at some specified time usually taken as 100 comparison with expected number, e.g. national average, expressed as a z score average or base 100 (where the average=100). For the present invention, the index values are constructed to work with decision making algorithms, e.g. min-max or weighted average.

The term "weighted average or utility" generally refers to the use of a coefficient or point scale to give relative weight to index data for critical factors, which are summed to create a utility. This allows for the usefulness of all areas to be compared on apples to apples basis when making an informed decision on which area to select having a suitable workforce.

General Embodiment of the Invention

From this point forward, the following words will describe a computer-implemented method and system that allows a user to access and analyze worker demographics which are critical to making workforce decisions between and amongst geographic areas. However, the following words are not a limitation on the scope of the present invention but are written to detail certain embodiments thereof.

From FIG. 1, user selections 10 are created when a user logs into the system 11, selects occupation 12 or industry categories 13, and selects critical factors 14 relating to worker demographics. User selections 10 create automated SQL statements that extract, integrate, and index disparate data relating to occupation 12 and industry 13 categories from at least one database, where the data is linked by common MSAs and used to make informed decisions as to which area is most useful to the user. All areas responsive to user selections 10 are ranked and returned in a virtual table 19 having index numbers 15 quantifying critical factors 14. The user screens 16 and weights 17 the data, thereby producing an area utility 18.

However, it is in the scope of the present invention where all areas returning data are ranked by a ranking factor. Each area's lowest returned index value 15 for a critical factor 14 is used to rank that area against all area's returning data, where all areas are ranked from highest to lowest value according to the each area's lowest returned index value 15.

Each area's lowest valued critical factor and the corresponding low value are extracted into additional columns in the virtual table 19. Ranking areas by the magnitude of each area's lowest critical factor 14 gives a number that reflects the likelihood of finding the area with the best workforce when taken against other critical factors 14 for all areas remaining in the virtual table 19 and gives the user a quick assessment of problematic critical factors 14 for each area, thereby minimizing their maximum regret when quickly assessing areas. The user screens all or some of the areas by setting a numerical range for critical 14 or informational factors. Finally, the user weights 17 the critical factors 14 on a scale based on user needs when selecting a workforce.

"Min-Max Regret" is short hand for minimizing your maximum regret. Min-Max regret is a sophisticated and powerful analytical technique that quickly gets to those geographic areas with the least negatives to help avoid a costly mistake. At first glance, this is counter intuitive because the initial instinct of most people is to try to find the area with the most positives. But, in real life, many decisions are made by finding the alternative with the least negatives, especially if there is a negative which will eliminate the option.

Here, the user places emphasis on the MSAs having the least negative data returned for each critical factor 14. An area with a high, simple, or weighted average may seem attractive, but the high average might disguise a low variable, which might make that area unacceptable. For an example, let's say that there was a MSA with a very large, dense population of the workers for your occupation and industry, but the wages and standard of living are more than you can afford, then that area would probably be eliminated from consideration. An area with a slightly lower population of desirable workers, but with a more affordable wage might be desired. The present invention may use the MIN function within a spreadsheet program for data returned for each critical factor associated with a geographical area. The user may sort the returned data with the highest minimum index for an area at the top.

Figure 2:
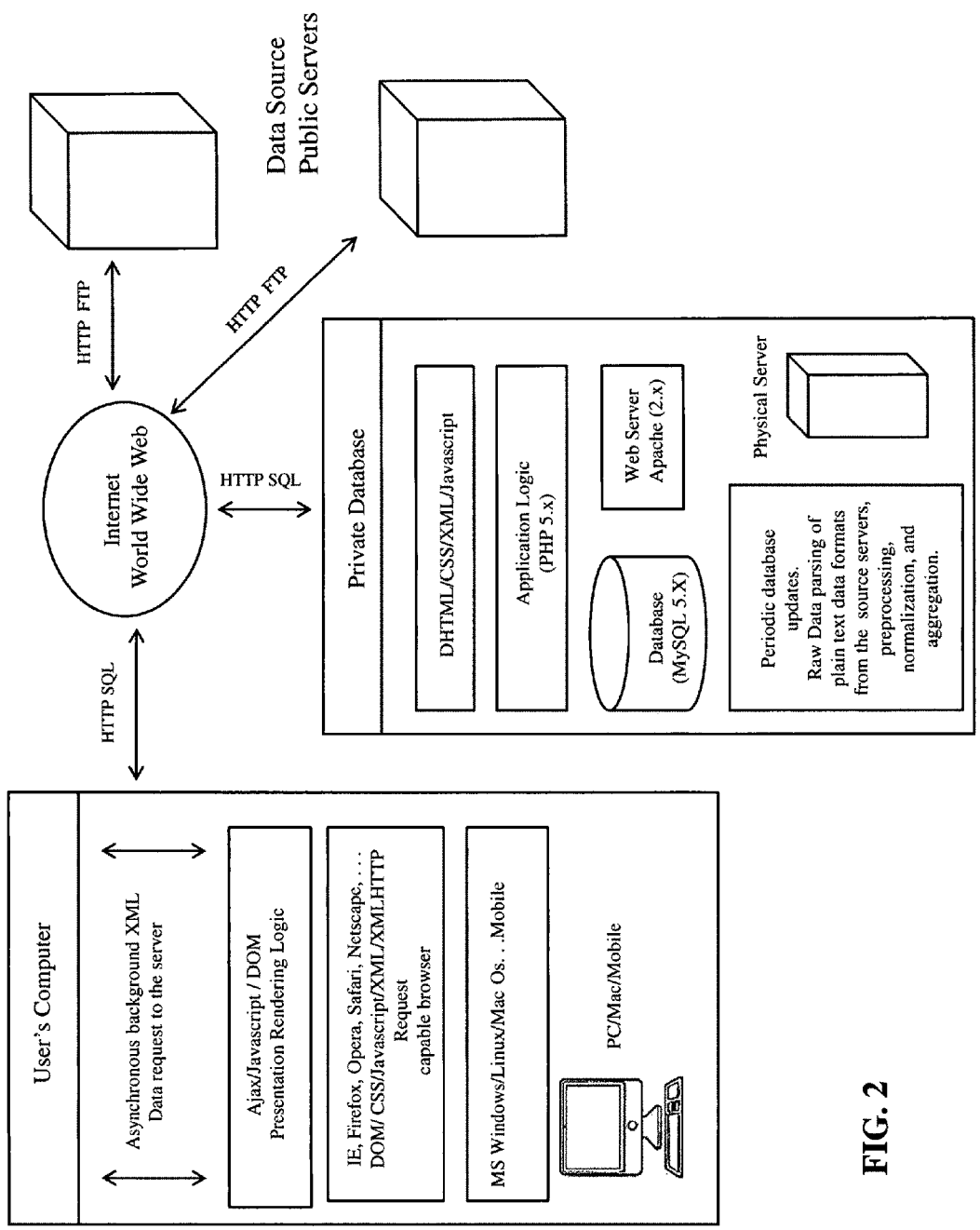
FIG. 2 depicts how data is retrieved and stored in a private database over a Network and made accessible to a user's computer over the same. The schematic also depicts data being mined from public or other private databases having information on industry or occupation worker demographics into the private database.

From FIG. 2, occupation or industry statistical data are mined over a Network from public servers maintained by the U.S. Census Bureau and the U.S. Bureau of Labor and Statistic, as well as other government or commercial agencies. The data is then stored in tables located within a private database located on a private computer server. The data mining process is performed via HTTP/FTP requests and is well known within the arts.

It is within the scope of the present invention wherein the computer-implemented method and system is a Network-based application, or the data or a program can be stored on a user's computer. All data related to worker demographics may be within a private database located on a remote computer server and accessible over a Network or downloaded from the private database and converted to a permanent or temporary file on the user's computer.

The private database of the present invention includes a relational database that stores a collection of data on individual tables having at least one column in common. The database is accessible over a Network and is kept by a private firm, non-limiting examples being MySQL, Interbase/Firebird, PSQL, IBM, Microsoft/Sybase, Oracle, and the like, where a firm shall have a database administrator or one or more applications developers. The database is associated with at least one module that receives structured language queries from the user's computer server that extracts raw data from tables within the database, indexes data from tables within the database, and returns such data to the user's computer server/computer according to the present invention.

The user's computer connects to a server over a Network and is allowed to see graphical information from the server's computer via web pages through PHP and JavaScript platforms, where asynchronous background XML data requests are sent to the computer server. The user's web based application and computer server uses a graphical user interface (GUI) to present the user with occupation or industry categories and critical factors for searching the private database. The user may view the web pages using Internet browsers such as Internet Explorer, Firefox, Netscape Navigator, Opera, Safari, and the like.

Critical factors relate to various occupational categories, occupational subcategories, various industry categories, or industry subcategories, and worker demographics for the same by geographic area. The U.S. Census Bureau and the U.S. Bureau of Labor and Statistics define the industry and occupation categories and subcategories of the present invention respectively.

The user selections embed search criteria within a structure language query to present to the private database. User selections are associated with a file on the user's computer, or within the web-based software located at the computer server, that generates an automated SQL/PHP statement. The objective of the automated SQL statement is to present a request to the private database to extract and index disparate data related to occupation and industry categories and worker demographics by geographic area, and return the data to the user where areas are ranked according to a ranking factor.

The complexity involved is hidden from the user who, in fact, requires no knowledge of SQL or PHP in order to use the invention. However, it is within the scope of the present invention where SQL, combined with PHP, is just one of many computer languages that can be used with the present invention. Other computer languages may include, without limitation, MS SQL/ASP.NET, MS Access/Visual Basic, MySQL/Coldfusion (CFML), HSQL/JSP (J2EE), PostgreSQL/Perl, MS SQL/Foxpro, Oracle/ASP.NET, as well as any combination of the above DBMS/language pairs, and the like.

Once user selections are made, initial SQL query statements are generated by at least one send/receive module at the computer's server and presented to at least one send/receive module at the private database. Each module is capable of reading and understanding the structured language query in use, e.g. SQL. Described embodiments of the invention disclose modules stored on both the computer server and at the private database. However, one of ordinary skill in the art recognizes that all relevant modules could be stored and executed at the user's computer, thus eliminating the need for a server computer.

All raw or indexed data are returned to the computer's server by at least one send/receive module located at the database, and ultimately, to the user's web browser, as a virtual table according to the present invention. PHP scripting language is used to manipulate information presented by the computer server to the user's web browser. As an alternative, raw and indexed data may be returned and stored to the user's computer in either an XML or CSV format.

From FIG. 1, critical factors 14 include statistical data mined over a Network from databases owned by the BLS, the Census Bureau, and the Council for Community and Economic Research. The data is essential to quantifying various industry or occupation categories and worker demographics gathered by those agencies, where non-limiting examples may include: the size of a metropolitan area, the number and types of minorities within an occupation, occupation employment within a geographic area, occupation unemployment within a geographic area, occupation wage within a geographic area, standard of living within a geographic area, industry unemployment within a geographic area, industry employment within a geographic area, total occupation employment within a geographic area, total occupation unemployment within a geographic area, total industry employment within a geographic area, total industry unemployment within a geographic area, job creation within a geographic area, new hires within a geographic area, separations within a geographic area, turnover rate within a geographic area, average wages within a geographic area, cost of living within a geographic area, average wage inverse within a geographic area, industry unemployment within a geographic area, unemployment average within a geographic area, industry workforce within a geographic area, percentage of minorities within a geographic area, gender make up within a geographic area, the percent of industry employment in the given occupation, the percent of establishments reporting the given occupation in the given industry, the median hourly industry and/or occupation wage, the median annual industry and/or occupation wage, the percent relative standard error for the median wage, employment percent relative error, and/or any combinations thereof. The disparate data is extracted from agency databases and inserted into tables maintained on the private database. All statistical data may be mined from databases owned and maintained by the BLS, the Census Bureau, and/or the Council for Community and Economic Research over a Network via computers having software programs known within the arts of data extraction from relational databases over a Network.

Data from each agency database is extracted monthly, quarterly or annually, as available, and stored in separate tables within the private database. Each record contains the MSA code, occupation code or industry code as appropriate, and the raw data. There are also lookup tables for translating codes to text for MSA code, SOC, and NAICS. There is a table that translates Census occupation codes to SOC and a table that translates Census industry codes to NAICS. For constraining data, there is a table of industry codes that occur for each occupation.

Once the disparate data is mined, the data may be joined into one or more tables within the private database. Joining the disparate data within a table is possible because the disparate data share at least one common field stored in at least one column of the agency tables. The disparate data may be joined via well-known merge routines in the database arts.

Disparate data is returned to the user as a virtual table 19 having statistical data relating to occupation or industry variables and worker demographics, which are linked by common MSAs. The Metropolitan Statistical Areas can differ from data set to data set and must be harmonized to allow an "apples to apples" comparison of variables by geographic area. Returned data is used to form utility numbers that reflect the likelihood of finding a higher or lower utility for an area based on critical factors 14 when compared against the same critical factors 14 for all MSAs.

In some instances, geographic codes are changed to match the MSA coding scheme used by the BLS and the Census Bureau. For example, the New England states do not use the MSA coding scheme when reporting industry and occupation statistics to the Census Bureau and BLS respectively. Their coding scheme is changed to create a common MSA field amongst all areas reporting statistics to the Census Bureau and BLS.

Although it is within the scope of the invention where the method includes using web based applications and a Network server to identify, extract, or index disparate data live from a private database, it is also possible to extract such data directly from databases owned and maintained over a Network by the BLS, the Census, or the Council for Community and Economic Research and present such data to the user as a virtual table according to the present invention.

The Computer, Logging In, and Creating a User Selection

The present invention may include software installed on a personal computer, a workstation, a minicomputer, a mainframe, a supercomputer, or a web or computer server. Each computer should at least have a central processing unit, a main memory for storing programs or data, and a fixed or hard disk drive unit, which is all coupled by a data bus. The computer should have a basic operating system, such as MS Windows, Linux, Mac OS, or the like. The software used with the present invention defines the functionality of the system according to the present invention and enables the system to work as described. The program may reside on, or in, a hard disk or the memory of a user's computer or may be accessible from a remote server over a Network. The program may run inside Microsoft Internet Explorer, Firefox, Netscape, Opera, Safari, or any compatible web browser, where the web browser is capable of rendering DOM, CSS, Javascript, XML, XMLHttp requests, and the like. The computer may be a desktop, server, portable, hand-held, set-top, or any other desired configuration.

The computer typically receives a number of inputs and outputs for communicating information externally. Non-limiting examples of inputs and outputs may include: a keyboard, a mouse, a trackball, a joystick, a touchpad, and/or a microphone, a CRT monitor, and/or an LCD display panel. Otherwise, the user selections may be received via another computer interfaced with a computer over Network or via a dedicated workstation interface or the like.

From FIG. 1, the user is presented with a web menu, which may be an HTML or HTTP accessed via a browser. The user is prompted to enter a pre-registered user identification and password at the first web menu 11. This information is selected by the user and is kept private for the user to access the present invention. A non-limiting example is an identification and password having a mixture of alphabetical and numerical values ranging from about six characters to about eight characters in length.

Occupation Selection

After the user logs-in, the process for locating a suitable workforce begins. FIG. 3 depicts a web menu where the user is prompted to form a request by selecting from a list of major occupational categories as defined by the U.S. Bureau of Labor and Statistics (BLS). Currently, there are over 820 BLS State Occupational Codes according to their occupational definition and further classified into approximately 23 major groups, 96 minor groups, and 449 broad occupations. Each occupation name, along with its various sub-categories, and database specific codes, is mined from the BLS database and is stored in a tables associated with the private database.

Non-limiting example of major BLS occupations may include, without limitation: Management Occupations; Business and Financial Operations Occupations; Computer and Mathematical Occupations; Architecture and Engineering Occupations; Life, Physical, and Social Science Occupations; Community and Social Services Occupations; Legal Occupations; Education, Training, and Library Occupations; Arts, Design, Entertainment, Sports, and Media Occupations; Healthcare Practitioner and Technical Occupations; Healthcare Support Occupations; Protective Service Occupations; Food Preparation and Serving Related Occupations; Building and Grounds Cleaning and Maintenance Occupations; Personal Care and Service Occupations; Sales and Related Occupations; Office and Administrative Support Occupations; Farming, Fishing, and Forestry Occupations; Construction and Extraction Occupations; Installation, Maintenance, and Repair Occupations; Production Occupations; Transportation and Material Moving Occupations; and the like. As an alternative, the user may directly type an occupational name into a field located on the web menu.

After selecting the major occupational category, the user may further refine the search by optionally selecting from a list of occupational subcategories associated with the tables located within the private database. For example, a user may select Management Occupations from the occupational field. The user may then optionally select from occupational subcategories under Management Occupations. As defined by the BLS, the occupational subcategories under Management Occupations may include, without limitation: Chief Executives; General and Operations Managers; Legislators, Advertising and Promotions Managers; Marketing Managers; Sales Managers; Public Relations Managers; Administrative Services Managers; Computer and Information Systems Managers; Financial Managers; Compensation and Benefits Managers; Training and Development Managers, Human Resources Managers; All Other, Industrial Production Managers; Purchasing Managers; Transportation, Storage, and Distribution Managers; Farm, Ranch, and Other Agricultural Managers; Farmers and Ranchers, Construction Managers; Education Administrators; Preschool and Child Care Center/Program, Education Administrators; Elementary and Secondary School, Education Administrators; Postsecondary, Education Administrators; All Other; Engineering Managers; Food Service Managers; Funeral Directors; Gaming Managers; Lodging Managers; Medical and Health Services Managers; Natural Sciences Managers; Postmasters and Mail Superintendents; Property, Real Estate, and Community Association Managers; Social and Community Service Managers; and Managers. Each major occupational category and subcategory thereof corresponds to a column within in a table housed on the private database, where the data is initially mined from the BLS database. The BLS uses the SOC scheme, but the Census Bureau uses its own coding system. It is within the scope of the present invention that the Census coding system is translated to SOC so that unemployment and minority data can be compared across data sources.

Industry Selection

After selecting a major occupation or optionally a subcategory thereof, the user is presented with another web menu, as depicted in FIG. 4. Here, the user may optionally select a major industry category as defined by the NAICS. The user may type an industry name into a field located on the web menu. The typed industry name is typically an NAICS industry name associated with a table within the private database.

Note that the user is only presented with industries employing occupations, or subcategories thereof, as selected by the user from the previous web menu. To see more industry choices at the present web menu, the user would select from broader occupations as listed on the previous web menu. However, when viewing the returned data, industry results for geographic regions will include all occupations, not just data for an occupation selected from a previous web menu.

There are over twenty NAICS industry sectors, further divided into thousands of sub-sectors, industry groupings, specific industries, and finally U.S. industries. Five sectors are mainly goods-producing sectors and fifteen are entirely services-producing sectors. NAICS allows for the identification of 1,170 industries. Non-limiting examples of NAICS industry sectors may include without limitation: Forestry, Fishing, Hunting, and Agriculture Support; Mining; Utilities;

Construction; Manufacturing; Wholesale Trade; Retail Trade; Transportation and Warehousing; Information, Finance and Insurance; Real Estate and Rental and Leasing; Professional, Scientific, and Technical Services; Management of Companies and Enterprises; Administrative and Support and Waste Management and Remediation Services; Educational Services; Health Care and Social Assistance; Arts, Entertainment, and Recreation; Accommodation and Food Services; Other Services (except Public Administration); and Unclassified. All statistical data is gathered by the U.S. Census Bureau. However, since the BLS uses NAICS and the Census Bureau uses its own coding system, the Census coding system is translated to NAICS so that unemployment data can be compared across data sources. That data is then stored on their database that is accessible over a Network. The data is mined and then transferred to the private database of the present invention.

After optionally selecting a major industry, the user may further refine their search by selecting from a list of industry subcategories associated with tables within the private database. For example, a user may select Manufacturing from the major industry field. The user may then optionally select from subcategories under Manufacturing, where the industry subcategories as defined by the NAICS would be Food Manufacturing; Beverage and Tobacco Product Manufacturing; Textile Mills; Textile Product Mills; Apparel Manufacturing; Leather and Allied Product Manufacturing; Wood Product Manufacturing; Paper Manufacturing; Printing and Related Support Activities; Petroleum and Coal Products Manufacturing; Chemical Manufacturing; Plastics and Rubber Products Manufacturing; Nonmetallic Mineral Product Manufacturing; Primary Metal Manufacturing; Fabricated Metal Product Manufacturing; Machinery Manufacturing; Computer and Electronic Product Manufacturing; Electrical Equipment; Appliance, and Component Manufacturing; Transportation Equipment Manufacturing; Furniture and Related Product Manufacturing; and/or Miscellaneous Manufacturing.

Selecting Critical Factors

Figure 5:
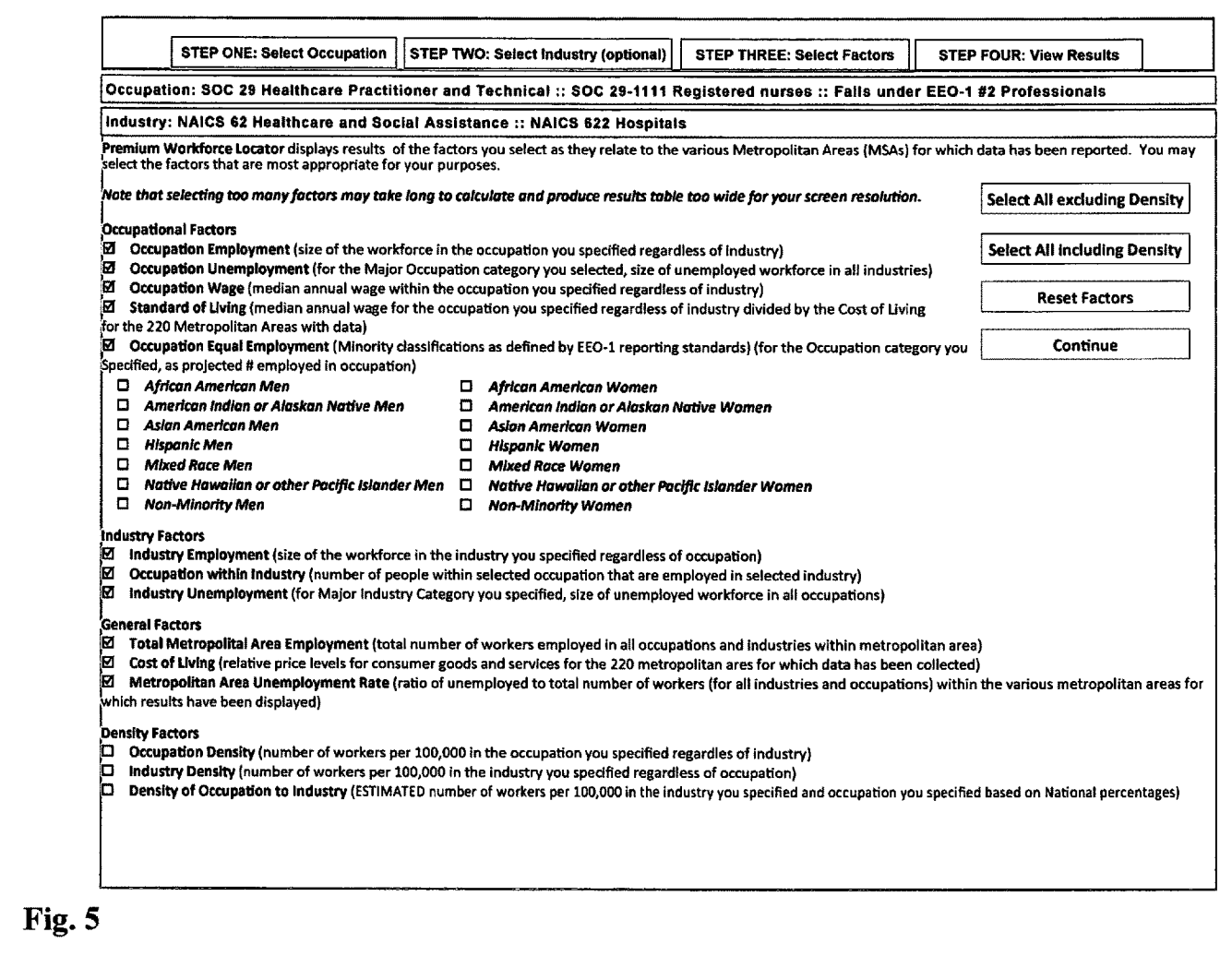

From FIG. 5, the user is prompted to select from a number of critical factors associated with the occupation or industry categories, or subcategories, selected from previous web menus. The list of critical factors may include without limitation: occupation minority, occupation employment, occupation unemployment, occupation wage, standard of living, industry employment, industry unemployment, total employment rate for a metropolitan area, total unemployment rate for a metropolitan area, or cost of living.

Occupation employment represents the size of the workforce in the occupation that the user selected, regardless of industry, for all MSAs returning data. Occupation Minority is an index of the number of women and minorities that can be found with in an occupation, regardless of industry, for all MSAs returning data. Occupation unemployment represents the number of unemployed people, in all industries, for all MSAs returning data. Occupation wage is the median annual wage within the user-selected occupation, regardless of industry, for all MSAs returning data. Standard of Living represents the median annual wage for the occupation selected by the user, regardless of industry, divided by the Cost of Living for all MSAs returning data.

Industry employment is the number of people employed in an industry selected by the user, regardless of occupation, for all MSAs returning data. Industry unemployment is the number of people unemployed in an industry, regardless of occupation, for all MSAs returning data. Total metropolitan area employment is the total number of people employed in all occupations and industries within an MSA. Cost of Living is the relative price levels for consumer goods and services for all MSAs returning data. Metropolitan area unemployment rate is a ratio of unemployed to total number of people for all industries and occupations for all MSAs returning data.

It is within the scope of the present invention where data for all critical factors may be returned to the user as index values. These critical factors represent at least one column of at least one database table containing the desired information for extraction. The user then sends the request to the private database by pressing a results tab located on the web menu. As an alternative, a user may structure a request by optionally bypassing any of these menus, thus creating a request that will retrieve information that is non industry or occupation related, e.g. statistical data relating to the Cost of Living Index, minority information, or Standard of Living Index.

Virtual Table

Figure 6:
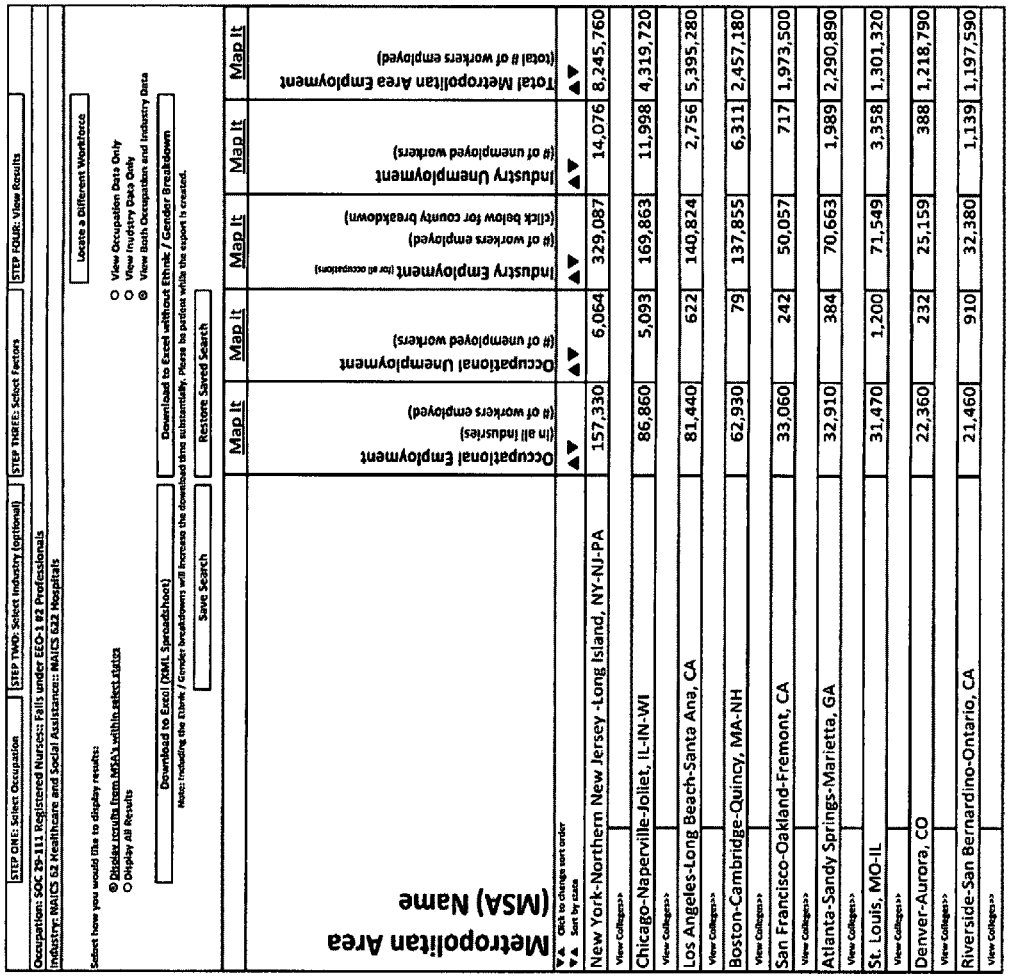
FIG. 6 depicts a web menu where data is returned to the user as a virtual table. The virtual table displays all areas returning data satisfying user selections sent to the private database, where all areas are ranked according to each area's lowest returned index value.

FIG. 6 displays the virtual table returned to the user's computer. The virtual table is a web screen having a number of columns and rows for all areas 20 returning data based on user selections. The virtual table shows data for each critical factor 21 extracted from the private database as identified by the user selections. Before being returned to the user's computer, all raw statistical data may be converted into an index or percentile value by an SQL statement.

Based on user selections of occupation or industry options and critical 21 or informational factors, the matrix contains all area's 20 returning data. However, all returned areas 20 are ranked according to the value of each area's lowest returned index value 22. This column 22 is designated Min-Max. Data is displayed to the user such that each critical factor 21 having the lowest index value and its corresponding low value are extracted into additional columns and used as ranking factors for all area's 20 returning data. Ranking areas by the magnitude of each area's lowest critical factor gives a number that reflects the likelihood of finding the area 20 with the best workforce when taken against other critical factors 21 for all areas 20 in the virtual table. Ranking in this manner gives the user a quick assessment of problematic critical factors 21 for each area 20, thereby minimizing their maximum regret when quickly assessing areas.

Figure 7:
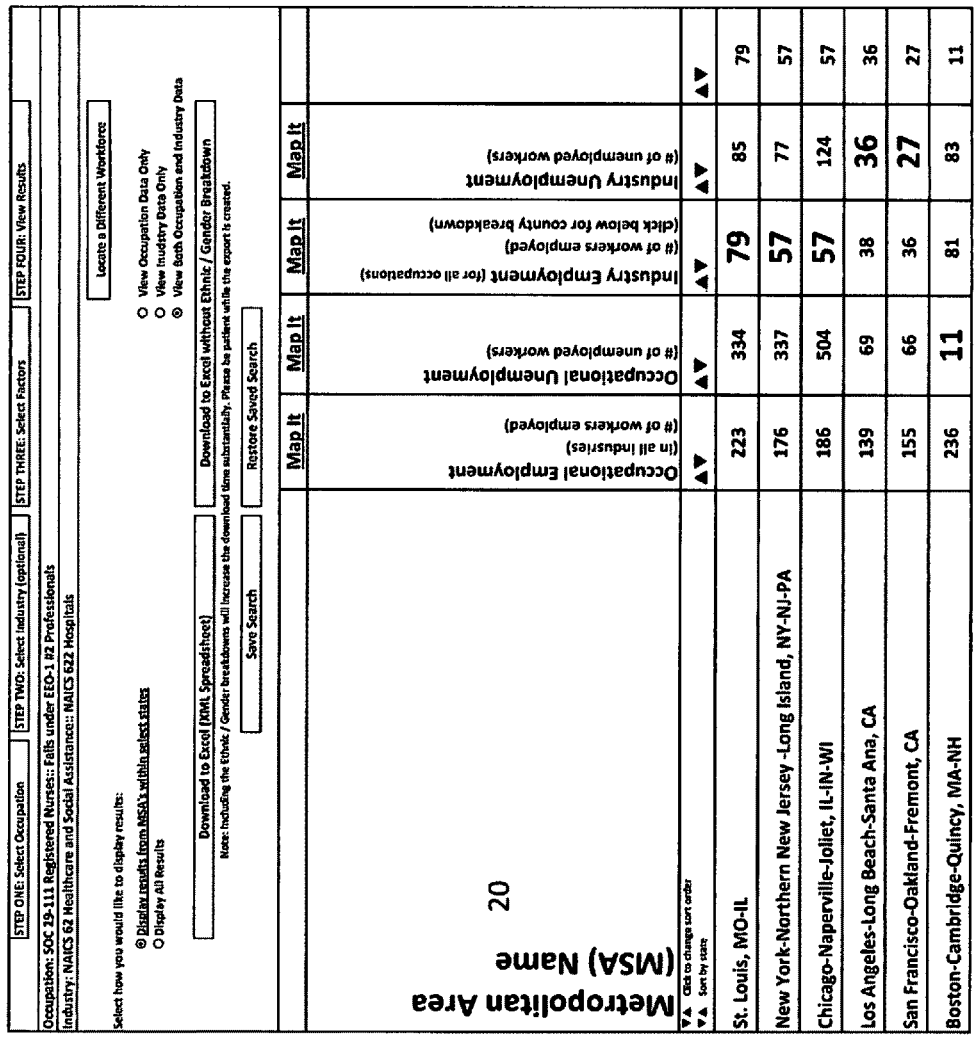
FIG. 7 depicts a virtual table where some areas are screened due to unacceptable low values for critical factors set by user needs, thereby creating a short list of acceptable areas.

From FIG. 7, the user screens all or some of the areas 20 by setting an acceptable range for critical 21 or informational factors. A non-limiting example being, FIG. 7 showing that a user removed areas Atlanta, Denver, and Riverside from the list of potential areas returned by the present invention. The reasons for removing these areas will be based on unacceptable low values for critical factors 21 that would prove too problematic for the user's workforce needs.

Figure 8:
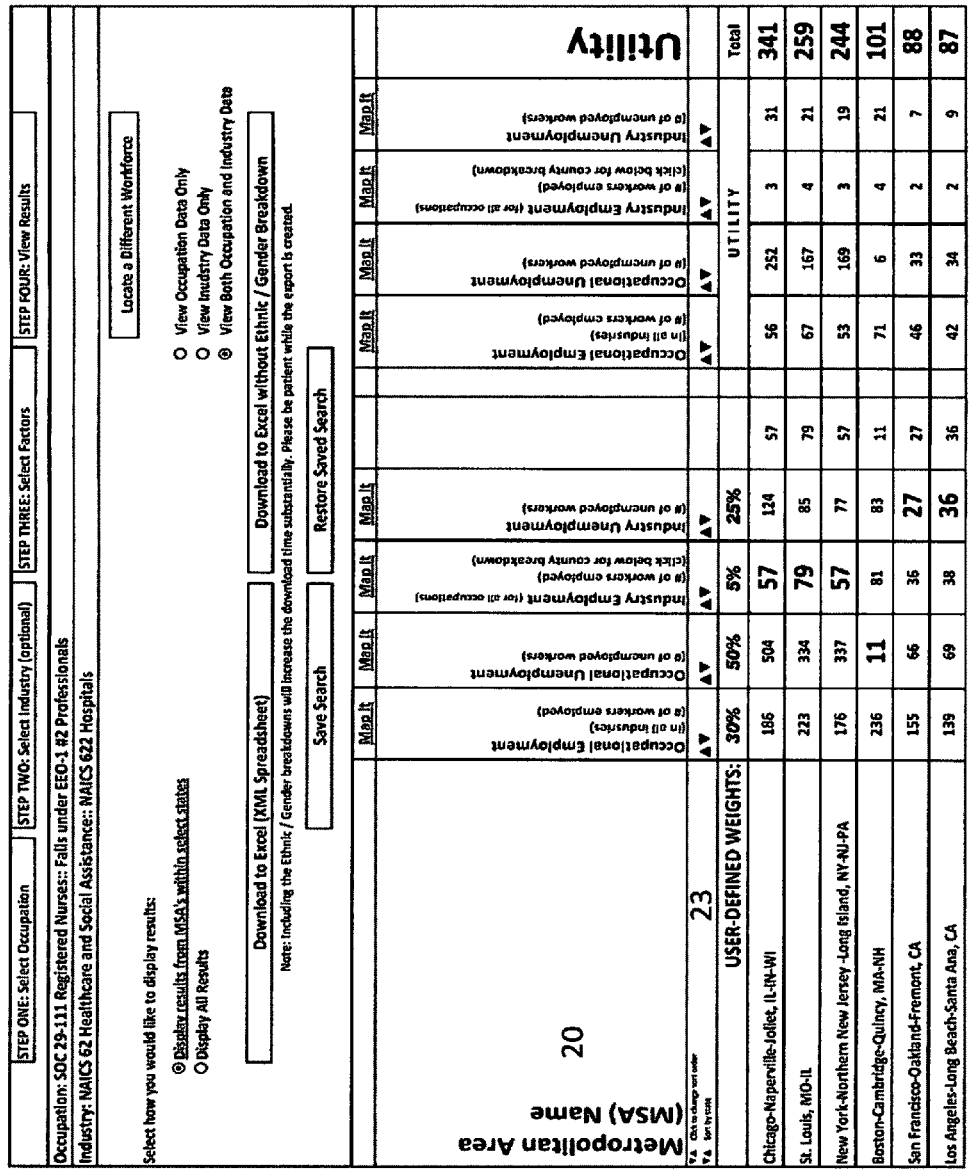
FIG. 8 depicts a virtual table where critical factors are subjectively weighted according to the user's needs and summed for each area creating a utility. Each area's utility can be compared giving the user a list of best areas that will give the least regret or the best return on a workforce if selected.

From FIG. 8, the user weights 23 the ranked critical factors 21 on a scale important to user needs when selecting a workforce. As a non-limiting example, FIG. 8 shows a percent based weighting factor 23. Here, critical factors 21 occupational employment is given a 30% weight by the user, occupational unemployment is given a 50% weight by the user, industry employment is given a 5% weight by the user, and industry unemployment is given a 25% weight by the user. Although, a percentage is used as the weighting coefficient, it is within the scope of the present invention wherein the weight coefficient may take the form of any set of numbers in which the ratio represents relative importance of each critical factor 21 according to the user's business needs. With the present invention, the user may express the importance of the critical factors 21 in several different ways. A non-limiting example being a five point scale for each critical factor 21, where the user rates a critical factor 21 with a factor of 5 for most important to 1 as least important. The user can also spread 100 points amongst the critical factors 21 to give relative weights.

Each area's weighted values 24 are summed to give a number that measures an area's utility 25 when measured against all areas 20 filtered through the screening process. Weighting 23 gives the disparate data utility 25. An area 20 with a high utility 25 may be of more interest to the user than an area 20 with a slightly lower utility 25 or vice versa. A simple average would include comparing a raw number returned for a critical factor for a specific MSA against the total average for that critical factor as calculated based on data averaged over all MSAs returning data.

It is with in the scope of the present invention wherein, the user may be presented with the options of displaying all returned results, the top twenty results, or may choose which returned data to view, indexed or raw values for various critical factors, thereby bypassing the Min-Max ranking feature.

Presenting the raw statistical data and index values in table form allows the user to make a solid qualitative assessment of the critical factors with respect to all MSAs returning data for the occupation and industry selection(s). The user's qualitative assessment of returned data may include, without limitation: the size of a workforce talent pool by city, job title, industry, and ethnicity, employment and unemployment rates returned to the user, the cost and standard of living returned to the user, the areas with the highest number of minorities by job, industry, and geographic location, the total employment within a geographic area, the standard of living within a geographic area, industry employment within a geographic area, industry unemployment within a geographic area, and/or total unemployment with in a geographic area.

Indexing

Once critical factors reflecting disparate data are returned to the user, one might ask: "How do the numbers for each critical factor compare for each MSA? What is a high value for a critical factor with respect to other MSAs returning data for the same critical factor? What is a low number? Relatively speaking, how low or how high is a number with respect to other MSAs returning a value for the same critical factor? Some of the numbers are in numbers of workers within industries located in an MSA, some numbers are in dollars; how does the user compare these apples to oranges? Is there a common number the user can use to compare the disparate data returned for each critical factor associated with an MSA?"

A convenient way to deal with these issues is an index. An index can be a number or formula expressing some property and/or ratio between two quantifiable things. An index can work for any and all data returned for each of the critical factors. If some numbers are higher and some lower, the user may use an index to compare the quality of a critical factor when compared to other MSAs having data returned for the same critical factor. With an indexing method, the user can compare disparate data on an "apples to apples" basis. It is within the scope of the present invention where indexing the data returned to the user may be in the form of a simple index value, a percentile, a simple average, a weighted average, or a min-max regret.

One kind of index is a simple index. With a simple index, if a number is the same as the average, its index is 100. For an average of 100, if an index value for an MSA is twice the index value averaged over all MSAs, its index value is 200. If the number is half the size, its index value is 50. A critical factor returned as a simple index will tell the user if the returned index number is above or below the average number for that critical factor averaged over all MSAs.

A percentile is another indexing scheme contemplated with the present invention. A percentile is another number that works like a simple index. The percentile presents a number on a scale of 100. The percentile indicates a number having a percent distribution that is equal to or below the highest number within the distribution, by definition 100%. For example, if an MSA has a percentile value at the bottom of the percentile scale with respect to averages across all MSAs, it is in the first percentile. If another city is in the median, it is in the 50th percentile, and so on. Unlike a simple index, a percentile will never exceed 100 by definition.

With the present invention, the preferred embodiment includes having index values and/or percentiles of all data returned to the user. In calculating both indexes and percentiles, the present invention uses the first two digits of the NAICS or SOC when locating and retrieving the data. Locating data in tables cells by the first two digits of the codes allows the best trade-off of granularity of data returned with the fewest cells having sparse or no data. For industry employment, a user is allowed to select two-digit through six-digit NAICS. For occupation employment, occupation wage and standard of living, a user is allowed to select two-digit through five-digit SOC codes. For occupation unemployment and occupation minorities, only the first two digits of the selected SOC is used to retrieve data. For industry unemployment, only the first two digits of the selected NAICS is used to retrieve data.

For the present invention, the Occupation Minority Index is calculated as follows. Because the sample size for the monthly Census is small, the weighted, value as calculated by the Census Bureau, is used. For all minority classifications, the weighted value is summed across 24 months of data for each occupation and each MSA. Minority women are counted twice (Hispanic women and non-Hispanic women of other minorities). This gives the total weighted value of minorities in each occupation in each MSA. The average weighted value across MSAs is calculated. Then the weighted value for each MSA is expressed as an index relative to the group average. Within each MSA, the distribution of minorities among various groups is expressed as percent contribution to the total weighted value of minorities within that MSA. The minority groups comprise African Americans, Asian American, Native Hawaiian or other Pacific Islander, American Indian or Alaskan native, Mixed Race, Hispanic, Non-Minority Women, Minority Women. A minority woman will be counted twice—once in her racial or nationality (Hispanic) group and again under Minority Women.

For the present invention, the indexing scheme is calculated as a simple ratio between a number for a critical factor within a specific MSA, divided by the average number for the same critical factor over all MSAs. The number for a critical factor within a specific MSA may be generated by taking a simple ratio between the numbers of interest for a category, divided by the sum of all people within an MSA that fits within that category. A non-limiting example being the occupational unemployment index, where the index may be calculated using the following non-limiting form:

$$\text{Occupation } Unemp. \text{ Index} = \frac{\text{Sum over 6 months(weighted value for } Unemp.\text{)}}{Avg. \text{ Sum over 6 months(weighted value for } Unemp. \text{ for all } MSAs\text{)}}$$

The above equation can be described as follows. Because the sample size for the monthly Census is small, the weighted value as calculated by the Census Bureau is used. The weighted value is summed across six months of data for each occupation and each MSA. This gives the total weighted value of unemployed workers capable of doing work in each occupation in each MSA. The average weighted value across MSAs is calculated. Then the weighted value for each MSA is expressed as an index relative to the group average. For each MSA that has an occupation unemployment index returned, the user may compare these index values against each other to see if an MSA has a higher or lower number of unemployed people capable of doing a specific job when compared to a similar pool of workers across all MSAs.

Another non-limiting example for a simple index is the occupational employment index, where the index may be calculated using the following:

$$\text{Occupation Employment Index} = \frac{\text{Number of employed in selected occupation in specific } MSA}{\text{The Average number of employed in selected occupation for all } MSAs}$$

The above equation can be described as a simple ratio between the numbers of employed people doing a specific job within an MSA at a given point in time. That number is then divided by the average number of employed people for that occupation over the same period of time for all MSAs within the private database having such data.

The Cost of Living Index is the raw index number as provided by the Council for Community and Economic Research. The index is a measure of the cost of living for maintaining a certain standard of living over a period of time. The Cost of Living Index measures differences in prices among areas at a single point in time.

Although examples for indexing are shown with respect to occupation minority index and occupation unemployment, and occupation employment index it is within the scope of the present invention where data for all critical factors may be returned to the user as SQL-generated index values or percentile values. This can be accomplished by embedding within the query language a similar equation as used above or similar equations denoting percentile values.

Creating Database Tables

Disparate data is initially mined from databases maintained by the BLS, the Census Bureau, and the Council for Community. The data mining process is not performed, per se, by a user of the invention, but by the database administrator of the private database. This data is then used to create at least one table located within the private database. Again, the data is statistical data essential to quantifying industries and occupations. The following is a non-limiting example of an SQL segment that downloads and extracts occupation employment and occupation wage and data from MS Excel files located at ftp://ftp.bls.gov/pub/special.requests/oes/oesm07ma.zip:

```
INSERT INTO occupationdata (msa_id, msa_name, occupation_id, name, type, total_employment, median_annual_wage);
SELECT AREA, AREA_NAME, OCC_CODE, OCC_TITLE, GROUP, TOT_EMP, A_MEDIAN FROM ExcelFiles;
UPDATE msa JOIN occupation_data USING (msa_id) SET msa.total_employment=occupation_data.total_employment WHERE occupation_id="XX-000."
```

The above SQL segment parses the Excel files with a PHP based parser and populates a the private database. In addition, the "MSA" table is updated with the MSA total employment data imports occupation data into table "occupation_data" (records with occupation_id=XX-0000 are cumulative for the MSA across occupations).

Occupation Employment data may be returned to the private database via the following query group by MSA, where 'XX-XXXX' designates the occupation selected for extraction:

```
SELECT msa.msa_id as msa_id,occupation_data.total_employment AS occupation_employment FROM occupation_data JOIN msa using(msa_id)
WHERE occupation_id='XX-XXXX';
```

Occupation Wage data may be returned to the private database via the following query group by MSA, where 'XX-XXXX' is designates the occupation selected for extraction:

```
SELECT msa.msa_id as msa_id,median_annual_wage,occupation_data.total_employment AS occupation_employment FROM occupation_data JOIN msa USING(msa_id)
WHERE occupation_id='XX-XXXX.'
```

The following is a non-limiting example of SQL segments that download and extract industry data into tables located within the private database. Due the amount of industry related data, creating industry tables occurs in a series of steps. Initially industry data is Downloaded from data archives located at ftp://ftp.bls.gov/pub/specialsequests/cew/2007/msa/allmsa07.zip, extracting the archive. One temporary attribute table is created via the following query:

CREATE TABLE import (row text);

Next said data is imported into a temporary "import" table, "industry_data_alt," via common SQL import utilities, non-limiting examples being mysqlimport, where lines are terminated-by="\n" database_name import.txt.

The next step for creating industry tables within the private database includes parsing the values from the temporary "import" table and inserting that data into the "industry_data_alt" table via the following query, data is queried for the first three quarters and for the fourth quarter annual data:

```
INSERT into industry_data_alt
(msa_id,industry_id,ownership,disclosure,total_employment)
SELECT concat(trim(substr(row,5,4)),'0') as
msa_id,trim(substr(row,12,6)) as industry_id,trim(substr(row,11,1))
as ownership,
trim(substr(row,25,1)) as disclosure,(trim(substr(row,34,9)) +
trim(substr(row,43,9)) + trim(substr(row,52,9))/3 as total_employment.
INSERT into industry_data_alt
(msa_id,industry_id,ownership,disclosure,total_employment)
SELECT concat(trim(substr(row,5,4)),'0') as
msa_id,trim(substr(row,12,6)) as industry_id,trim(substr(row,11,1))
as ownership,
trim(substr(row,285,1)) as disclosure,(substr(row,294,9) +
substr(row,312,9) + substr(row,303,9))/3 as total_employment
FROM import;
```

After industry data is placed into the industry_data_alt table, post import data manipulations are performed via the following queries:

```
UPDATE industry_data_alt set total_employment=−1 where
disclosure='N' and total_employment=0.
```

MSA codes may be reconciled for data in the industry_data_alt tables via the following query:
UPDATE industry_data_alt set msa_id_raw=msa_id.
Some industry data is reassigned to different MSAs to account for super MSAs versus Divisions via the following queries:
UPDATE industry_data_alt set msaid=70750 where msa_id=12620.
Unwanted industry data may be deleted by the following query:
DELETE from industry_data_alt where industry_id=31.
All data returned to the private database may be joined by industry mages by the following query:

```
INSERT into industry_data_alt
SELECTmsa_id,31,sum(total_employment),
ownership,disclosure,msa_id_raw
FROM industry_data_alt where substr(industry_id,1,2)=31 and
total_employment>0 group by msa_id;
```

Industry data at the county level may be extracted from ftp://ftp.bls.gov/pub/special.requests/cew/2007/county/*.zip (about 50) using the same query steps as above.
Industry Employment data may be returned to the private database via the following query, where XXXXXX designates an industry code returned to the database:

```
SELECT msa.msa_id as
msa_id,SUM(industry_data_alt.total_employment) AS
industry_employment_alt FROM industry_data_alt JOIN msa USING
(msa_id) WHERE industry_id=XXXXX AND
industry_data_alt.total_employment>=0 AND ownership=5 GROUP
BY msa.msa_id;
```

SQL Query, Indexing, and Percentiles

Although the invention describes using the PHP/JavaScript/SQL platforms to query the private database, it is within the scope of the present invention where the combined platforms are just one of many computer languages that can be used with the present invention. Other computer languages may include, without limitation: MS SQL/ASP.NET, MS Access/Visual Basic, MySQL/Coldfusion (CFML), HSQL/JSP (J2EE), PostgreSQL/Perl, MS SQL/Foxpro, Oracle/ASP.NET.

However, with the present invention, GUIs are presented to the user's computer by the computer server via the PHP and JavaScript platforms. It is well known within the arts that PHP is a scripting language that produces dynamic web pages with stand-alone graphical applications. With the present invention the use of PHP may include, without limitation: the authentication users; interpreting and displaying error messages to user; displaying relevant sub-categories when a major occupation or industry is selected; defining additional variables such as cumulative sum for calculations; reduce the complexity and improve the efficiency of some queries; with programming loops and conditionals such as IF statements; WHILE statements; and/or FOR/EACH statements.

The present invention also makes use of JavaScript on the user's computer. Non-limiting uses of JavaScript may include: sorting occupation selections in an occupation selection screen, sorting industry selections in an industry selection screen, limiting the results tables to displaying the top 20 or all results, expanding to county data, expanding to minority percentages, displaying user results returned to the user in a View, constraining industry selections by selected occupation, processing sort order requests, processing downloads of returned data to the users computer to CSV.

All user selections of occupation, industry, and critical factors, optional or otherwise, via PHP/JavaScript generate an automated SQL-statement that locates the private database over a Network, extracts data from tables in the database, and converts the data to an index or percentile. The data may be presented to the user as a web-based virtual table or the information can be downloaded onto the user's computer as an XML or CSV file to be viewed in a separate spreadsheet program.

The database is maintained on the computer server and is capable of reading SQL language queries. At the applications layer, for output to the user's computer one may find DHTML, XML, CSS, or JavaScript platforms. A database manager periodically updates the database by the raw-data parsing of plain-text data formats from the agency servers, via preprocessing, normalization, and aggregation of said raw data.

In a preferred embodiment, the query may be in the form of an SQL code that is supported by the MySQL-PHP platform. MySQL is a multithreaded, multi-user SQL database management system (DBMS). The basic program runs as a server providing multi-user access to a number of databases. MySQL is commonly used in web applications and acts as the database component of the LAMP, MAMP, and WAMP platforms, i.e. Linux, Mac, Windows, Apache, MySQL-PHP, Perl, and Python platforms.

However, one of ordinary skill in the art would recognize that other platform sources may be used to initiate the query of the present invention. Other platform sources may include, but are not limited to: Oracle, IBM, ANSI, and the like. Any programming language that works with the MySQL platform may be used with the present invention. The programming languages may include but are not limited to: ANSI C/ANSI C++, Delphi, and Visual Basic.

A standard SQL statement usually takes the form: "SELECT <string> FROM <string> WHERE <string> GROUP BY<string> HAVING <string> ORDER BY <string>." More information on SQL can be found at: http://dev.mysql.com/doc/.

While only the SELECT and FROM strings are required, it is desirous to include other strings to further narrow and optimize the search. The result of a SELECT statement is a subset of data that matches the search criteria, and is stored as a temporary table, often termed the "result table." In the SELECT statement illustrated above, the FROM string indicates the table name from which the information is being retrieved. The remaining strings included in the SELECT statement direct which columns are to be returned and stored in the results table. The WHERE string includes filtering criteria; and therefore it dictates which rows satisfy the search criteria. The results are to be returned and stored in the results table.

A join operation is usually performed by specifying more than one table in the FROM string of the SELECT statement. A join operation allows rows from multiple tables all satisfying the search criteria to be sequentially combined into a single row and stored in the results table. This becomes important for grouping relevant information into a single table, rather than requiring the search engine to repeatedly parse the entire database to assemble the requested data, thus saving time.

Initial SQL Segments

The common SQL segment indicating the location of the database may take the following non-limiting form:

The common SQL segment indicating MSAs may take the following non-limiting form:

```
Common queries start
SELECT m.*,m.name AS msa_name FROM msa AS m |
Common queries end
```

The above SQL segment displays the MSA name rather than the MSA code whenever MSAs are displayed.

SQL Segments to Retrieve Raw Data

All SQL queries are tethered to both common SQL segments to retrieve raw data for critical factors. These SQL segments retrieve raw data for critical factors linked by common MSAs. Non-limiting examples may include raw data associated with total employment for occupations and industries linked via common MSAs, total unemployment for occupations and industries linked by common MSAs, numbers reflecting minority make up of occupation and industries linked by common MSAs, numbers associated with a cost of living index, total MSA employment and unemployment rates, and occupation wage occupation density for an MSA, industry density for an MSA.

A non-limiting example of an SQL segment for locating raw data relating to the critical factor occupational employment may take the following form:

```
Queries for factor OCCUPATION EMPLOYMENT
(in all industries)
(# of workers employed) start
SELECT msa.msa_id as msa_id,occupation_data.total_employment AS
occupation_employment FROM occupation_data JOIN msa
using(msa_id) WHERE occupation_id='17-0000' |
Queries for factor OCCUPATION EMPLOYMENT
(in all industries)
(# of workers employed) end
```

The above SQL segment can be described as follows: For each MSA code listed in our master list of MSAs, the SQL segment selects the listed total employment value in the occupation-data table. The occupation code is the selected SOC corresponding with the user-selected occupation from the web Menu (in this non-limiting example 17-0000).

The above SQL segment identifies tables within the private database having MSAs with data related to the total employment of the user selected occupation. All MSAs having raw data on total employment for the user selected occupation is then joined using the MSA identification and the occupational identification value. If an MSA has a total employment number for the occupation selected by the user, then such data is returned to the user and may be viewed in the virtual table. It is within the scope of the present invention where similar SQL segments are generated for all critical factors related to occupation unemployment, industry employment, industry unemployment, metropolitan unemployment rate, occupation wage, cost of living index, cost of living, occupation density within an MSA, industry density within an MSA, where the segment joins total employment or total unemployment data relating to occupation or industry and link them via common MSAs.

SQL Segments for Locating and Indexing Critical factors

To retrieve indexed data for critical factors, other SQL segments are generated based on the user's selection of occupation and industry, and/or subcategories thereof, and the user's selection of critical factor, along with selecting a graphical tab that initiates the index option. The following non-limiting example gives an SQL segment that locates and indexes data from the private database per the user's selection of occupation, and/or subcategories thereof, and the user's selection for the critical factor occupation unemployment, and selection of the indexing option:

```
Queries for factor OCCUPATION UNEMPLOYMENT INDEX
(in all industries)
(1.0 = average) start
SELECT MAX(date) AS max_month FROM employment_data |
0.57918095588684 SELECT msa_id,SUM(value) AS
occupation_unemployment FROM employment_data WHERE
occupation_id LIKE '17-%' AND employment_data.type=2 AND
date<='2008-07-01' AND date>='2008-01-01' GROUP BY msa_id |
Queries for factor OCCUPATION UNEMPLOYMENT INDEX
(in all industries)
(1.0 = average) end.
```

The above SQL segment can be described as follows: select the MSA code and the sum of weighted values from the employment_data table, where the first two digits of the SOC are 17 and the survey respondent is unemployed (type=2) and the survey records are between Jan. 1, 2008 and Jul. 1, 2008 (our most recent 6 months of data).

The above SQL statement selects the occupational unemployment rate in all industries for all MSAs returning data for that critical factor. The occupation unemployment index is generated according to a simple index scheme where the average is 100. The present invention groups the MSAs returning data by an identifier for each MSA having such data. Data is updated monthly and only the most recent six months of data are used. The LIKE statement broadens the user's selected occupation code (five-digits) to the major (two-digit) category for more complete data.

It is within the scope of the present invention where similar SQL segments are generated to index raw data, or previously indexed values, for critical factors related to occupation employment, industry employment, industry unemployment, metropolitan unemployment rate, occupation wage, cost of living index, occupation density within an MSA, industry density within an MSA, where the present invention uses a simple indexing scheme to index raw data. For index values relating to occupation, the index value reflects data for all industries employing the user-selected occupation. For index values relating to industry, the index value reflects data for all occupations employed within the user selected industry. The above query segment is typical of SQL statements used in the present invention for indexing raw data associated with critical factors in the private database, where indexing is based on a simple indexing scheme.

```
Queries for factor METROPOLITAN AREA UNEMPLOYMENT
RATE
(for all industries and occupations) start
SELECT msa_id,total_unemployment FROM msa WHERE
total_unemployment > 0 |
Queries for factor METROPOLITAN AREA UNEMPLOYMENT
RATE
(for all industries and occupations) end
```

The above SQL segment can be described as follows: The unemployment rate is stored with each MSA name and code, and then this query selects the Unemployment Rate for each MSA stored in the master MSA table.

```
Queries for factor COST OF LIVING INDEX
(relative price levels for consumer good and services)
(100.0 = average) start
SELECT msa_id,living_cost FROM msa WHERE living_cost > 0
Queries for factor COST OF LIVING INDEX
(relative price levels for consumer good and services)
(100.0 = average) end
```

The above SQL segment can be described as follows: The Cost of Living Index is stored with each MSA name and code, and then this query selects the Cost of Living Index for each MSA stored in the master MSA table.

To retrieve indexed data for the critical factor Standard of Living, the following non-limiting SQL segment locates and indexes data from the private database:

```
Queries for factor STANDARD OF LIVING
(Wage/Cost of Living) start
SELECT msa.msa_id AS
msa_id,(occupation_data.median_annual_wage/msa.living_cost) AS
living_standard,median_annual_wage FROM occupation_data JOIN
msa using(msa_id) WHERE occupation_id='17-0000' |
Queries for factor STANDARD OF LIVING
(Wage/Cost of Living) end
```

The above SQL statement creates and retrieves a Standard of Living index by taking a simple ratio between the occupation wage and the cost of living, where the index value is then linked by common MSAs. Both the occupation wage and cost of living are reported in U.S. dollars. For each MSA in the master listing of MSA codes, the SQL segment obtains the median annual wage from the occupation_data table where the occupation SOC equals the user selected occupation and divides it by the Cost of Living index from the MSA table.

To retrieve data for critical factors associated with industry data, an initial SQL segment may be generated based on the user's selection of industry, and/or subcategories thereof, and the user's selection of industry related critical factors. An example SQL segment statement formed after the user's industry selections may take the following form:

```
Queries for factor INDUSTRY EMPLOYMENT
(for all occupations)
(# of workers employed) start
SELECT msa.msa_id as
msa_id,SUM(industry_data_alt.total_employment) AS
industry_employment_alt FROM industry_data_alt JOIN msa USING
(msa_id) WHERE industry_id='72' AND
industry_data_alt.total_employment>=0 AND ownership=5 GROUP
BY msa.msa_id |
SELECT * FROM industry_data_alt WHERE industry_id='72' AND
industry_data_alt.total_employment < 0 |
SELECT SUM(total_employment) AS total_employment FROM
msa_county INNER JOIN industry_county_data USING (county_id)
WHERE industry_id=72 AND msa_id='10180' AND disclosure!='N'
AND owner=5 |
Queries for factor INDUSTRY EMPLOYMENT
(for all occupations)
(# of workers employed) end
```

The above SQL segments retrieve raw data for all industries returning data for the user-selected occupation. For each MSA, the total employment is selected for each county where the county's MSA is the desired MSA and the data is public (not equal to Null) and the company reporting is public. First, for each MSA in the master table, the sum is calculated for total employment where industry is the selected industry and the value is valid (greater than zero) and the company reporting is public. Second, for each MSA, obtain any footnoted values (less than zero) for the selected industry. The external database includes footnotes for non-disclosed and private data. These characters are converted to negative numbers on import so that they can be distinguished and referenced in the display.

The numbers for total employment in an industry is for all occupations employed within that industry for an MSA. It is within the scope of the present invention where the above SQL segment retrieves industry data for total employment for specific counties within MSAs. The above SQL segment may be generated many times across many MSAs having data reflecting industry total employment at the MSA and county levels.

Data Analysis

It is within the scope of the present invention where the user may filter all returned data, be it raw data, indexed data, or data that has been calculated as a percentile, where both sides of the mean are calculated separately. The user may enter into a field located within the results view the number for which filtering will be based and may opt to filter numbers that are greater than or equal to the selected number or less than or equal to the selected number.

It is within the scope of the present invention where the user may perform a simple average of the indexed and percentile values returned for a critical factor across all MSAs.

It is within the scope of the present invention where the user may perform a weighted average for all indexed and percentile values returned to the user. The user may select weight factors from the group consisting of very important, important, average, little weight, and no weight. Or, the user may allocate 100 points among factors, with zero being no weight but to be displayed.

It is within the scope of the present invention wherein the user may perform a Min-Max regret on all index and percentile data returned to the user.

The foregoing words describe one embodiment of a computer-implemented method and system that allows an employer to quickly assess the advantages and disadvantages associated with having a business in a geographical area with a number of people to fill its workforce. However, these words are not a limitation on the scope of the present invention, but are written to detail certain embodiments thereof. It should be understood that changes may be made to the specific occupation selections, industry selections, and/or query value options without departing from the scope of the invention, thus, the scope of the present invention is defined solely by the following claims.

We claim:

1. A computer implemented method that locates a workforce across many geographic areas and allows a user to assess the amount harm each area presents to their business needs, the method comprising:
   a. a user search that identifies and returns into a matrix geographic areas and their raw values relating to occupation variables, industry variables, or workforce variables;
   b. the user assessing the returned areas from step a.) by their values to subjectively remove unacceptable areas that are overly harmful to the their business needs;
   c. the user employing a Min-Max Regret to select at least one remaining area from step b.) having the least harmful values to their business needs;
   d. wherein, the Min-Max Regret of step c.) includes the ability to simultaneously compare all remaining areas of step b.) with total utility numbers and subjectively weighted variables and values from each area, wherein a total utility number for an area is created by indexing values returned for any variable for an area against their respective national average, the user subjectively weighting the importance of each variable and their index value by a percentage or five point scale, adding all weighted indexed values for an area into one total utility number; and e. wherein, each total utility number of step d.) qualitatively allows the user to simultaneously assess and compare all area's workforce size, occupation variables, industry variables, and workforce variables to select the least harmful area with the desired workforce, thereby completing the Min-Max Regret.

2. The method of claim 1, wherein the raw values are numbers that qualify or quantify variables relating to occupation data, industry data, or workforce demographics.

3. The method of claim 1, wherein geographic areas, or areas, are regions characterized by Metropolitan Statistical Areas as defined by the Office of Management and Budget (OMB) and other United States federal government agencies for statistical purposes.

4. The method of claim 1, wherein the user comprises a business, the media, or any other person or organization that needs to find a workforce among various Metropolitan Statistical Areas.

5. The method of claim 1, wherein all areas and their relevant values are generated, or displayed, or stored on permanent or temporary computer files on the user's computer or generated and accessed from a DBMS over a Network.

6. The method of claim 1, wherein occupation data, industry data, or workforce demographics are categories that are defined by variables that include the number and types of minorities within an occupation, occupation employment within a Metropolitan Statistical Area, occupation unemployment within a Metropolitan Statistical Area, occupation wage within a Metropolitan Statistical Area, standard of living within a Metropolitan Statistical Area, industry unemployment within a Metropolitan Statistical Area, industry employment within a Metropolitan Statistical Area, total occupation employment within a Metropolitan Statistical Area, total occupation unemployment within a Metropolitan Statistical Area, total industry employment within a Metropolitan Statistical Area, total industry unemployment within a Metropolitan Statistical Area, job creation within a Metropolitan Statistical Area, new hires within a Metropolitan Statistical Area, separations within a Metropolitan Statistical Area, turnover rate within a Metropolitan Statistical Area, average wages within a Metropolitan Statistical Area, cost of living within a Metropolitan Statistical Area, average wage inverse within a Metropolitan Statistical Area, industry unemployment within a Metropolitan Statistical Area, unemployment average within a Metropolitan Statistical Area, industry workforce within a Metropolitan Statistical Area, percentage of minorities within a Metropolitan Statistical Area, gender make up within a Metropolitan Statistical Area, the percent of industry employment in the given occupation, the percent of establishments reporting the given occupation in the given industry, the mean hourly industry or occupation wage, the mean annual industry and/or occupation wage, the percent relative standard error for the mean wage, employment percent relative error, or any combinations thereof.

7. The DBMS of claim 5, wherein the database is private and housed on a computer server and accepts query languages comprising MS SQL/ASP.NET, MS Access/Visual Basic, MySQL/Coldfusion (CFML), HSQL/JSP (J2EE), PostgreSQL/Perl, MS SQL/Foxpro, Oracle/ASP.NET, or any combinations thereof.

8. A system to facilitate and support the locating of a workforce across many geographic areas and allows a user to assess the amount harm each area presents to their business needs, the system comprising:
   a.) A networked computer connected to a DBMS capable of using variables relating to occupation data, industry data, or workforce demographics to simultaneously filter and rank many Metropolitan Statistical Areas by;
   b.) a user search that identifies and returns into a matrix geographic areas and their raw values relating to occupation variables, industry variables, or workforce variables;
   c.) the user assessing the returned values of step b.) for each geographic area to subjectively remove unacceptable areas that are overly harmful to the their business needs;
   d.) the user employing a Min-Max Regret to select at least one remaining area from step b.) having the least harmful variables to their business needs;
   e.) wherein, the Min-Max Regret of step d.) includes the ability to simultaneously compare all remaining areas of step c.) with total utility numbers and subjectively weighted variables and values from each area, wherein a total utility number for an area is created by indexing raw values returned for any variable for an area against their respective national average, the user subjectively weighting the importance of each variable and their index value by a percentage or five point scale, adding all weighted indexed values for an area into one total utility number, ranking the remaining areas by their total utility numbers; and
   f.) wherein, each total utility number of step e.) qualitatively allows the user to simultaneously assess and compare all area's workforce size, occupation variables, industry variables, and worker variables to select the least harmful area with the desired workforce, thereby completing the Min-Max Regret.

* * * * *